United States Patent
Mais et al.

(10) Patent No.: US 10,184,817 B2
(45) Date of Patent: Jan. 22, 2019

(54) SENSOR SYSTEM FOR DETERMINING AT LEAST ONE PARAMETER OF A FLUID MEDIUM FLOWING THROUGH A CHANNEL STRUCTURE

(71) Applicant: Robert Bosch GmbH, Stuttgart (DE)

(72) Inventors: Torsten Mais, Ludwigsburg (DE); Ulrich Wagner, Munich (DE); Hans Beyrich, Freiberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 90 days.

(21) Appl. No.: 15/113,328

(22) PCT Filed: Nov. 27, 2014

(86) PCT No.: PCT/EP2014/075743
§ 371 (c)(1),
(2) Date: Jul. 21, 2016

(87) PCT Pub. No.: WO2015/110205
PCT Pub. Date: Jul. 30, 2015

(65) Prior Publication Data
US 2017/0003154 A1    Jan. 5, 2017

(30) Foreign Application Priority Data

Jan. 23, 2014 (DE) .................. 10 2014 201 213

(51) Int. Cl.
*G01F 1/684* (2006.01)
*G01D 11/24* (2006.01)
*G01F 5/00* (2006.01)

(52) U.S. Cl.
CPC ......... *G01F 1/6842* (2013.01); *G01D 11/245* (2013.01); *G01F 5/00* (2013.01)

(58) Field of Classification Search
CPC ...... G01F 1/684; G01F 1/6842; G01F 1/6845; G01F 5/00; G01D 11/24; G01D 11/245
See application file for complete search history.

(56) References Cited

U.S. PATENT DOCUMENTS

| 7,665,351 B2* | 2/2010 | Kamiya | .................. G01F 1/684 |
| | | | 73/114.32 |
| 2013/0055801 A1* | 3/2013 | Kohno | .................. G01F 1/6842 |
| | | | 73/114.34 |

FOREIGN PATENT DOCUMENTS

| DE | 198 15 654 A1 | 10/1999 |
| DE | 10 2010 061 348 A1 | 7/2011 |

(Continued)

OTHER PUBLICATIONS

International Search Report dated Feb. 26, 2015 of the corresponding International Application PCT/EP2014/075743 filed Nov. 27, 2014.

*Primary Examiner* — Justin Olamit
(74) *Attorney, Agent, or Firm* — Norton Rose Fulbright US LLP; Gerard Messina

(57) ABSTRACT

A sensor system for determining at least one parameter of a fluid medium flowing through a channel structure. The sensor system has a sensor housing, particularly a plug-in sensor that is inserted or insertable into a flow pipe and in which the channel structure is formed. The sensor housing has a housing body and a cover. The channel structure has a main channel and a measuring channel. At least one sensor chip determining the parameter of the fluid medium is disposed in the measuring channel. The sensor housing has an inlet into the channel structure, the inlet pointing counter to a main flow direction of the fluid medium, at least one main-channel outlet from the main channel and at least one measuring-channel outlet from the measuring channel. The main-channel outlet is disposed on an end face or on a (Continued)

downstream side of the cover based on the main flow direction.

10 Claims, 4 Drawing Sheets

(56) References Cited

FOREIGN PATENT DOCUMENTS

DE 10 2010 020 264 A1 12/2011
DE 10 2012 211 133 A1 1/2014
EP 0 369 592 A2 5/1990

\* cited by examiner

SENSOR SYSTEM FOR DETERMINING AT LEAST ONE PARAMETER OF A FLUID MEDIUM FLOWING THROUGH A CHANNEL STRUCTURE

BACKGROUND INFORMATION

Numerous methods and devices for determining at least one flow property of fluid media, thus, of liquids and/or gases, are conventional. The flow properties as possible parameter may be any measurable physical and/or chemical properties which qualify or quantify a flow of the fluid medium. In particular, it may be a flow velocity and/or a mass flow and/or a volumetric flow.

The present invention is described hereinafter particularly with reference to what are referred to as hot-film air-mass meters as described, for example, in Konrad Reif (editor): "Sensoren im Kraftfahrzeug" (Sensors in the Motor Vehicle), 1st edition, 2010, pages 146-148. Generally, such hot-film air-mass meters are based on a sensor chip, especially a silicon sensor chip, e.g., having a sensor membrane as measuring surface or sensor area which is able to be overflowed by the flowing fluid medium. The sensor chip usually includes at least one heating element as well as at least two temperature sensors which, for example, are disposed on the measuring surface of the sensor chip, the one temperature sensor being mounted upstream of the heating element and the other temperature sensor being mounted downstream of the heating element. A mass flow and/or volumetric flow of the fluid medium may be inferred from an asymmetry of the temperature profile detected by the temperature sensors, which is influenced by the flow of the fluid medium.

Hot-film air-mass meters usually take the form of plug-in sensors, which are permanently or exchangeably insertable into a flow pipe. For example, this flow pipe may be an induction tract of an internal combustion engine.

In this context, a partial flow of the medium flows through at least one main channel provided in the hot-film air-mass meter. A bypass channel is formed between the inlet and the outlet of the main channel. In particular, the bypass channel is formed in such a way that it has a curved section for redirecting the partial flow of the medium that has entered through the inlet of the main channel, the curved section transitioning in further course into a section in which the sensor chip is located. The last-named section represents the actual measuring channel in which the sensor chip is disposed.

In practice, hot-film air-mass meters of this kind must satisfy a multitude of requirements. Besides the goal of reducing a pressure drop at the hot-film air-mass meter overall by suitable designs in terms of fluid mechanics, one of the main challenges is to further improve the signal quality as well as the robustness of the devices with respect to contamination by oil droplets and water droplets as well as soot particles, dust particles and other solid-body particles. For example, this signal quality relates to a mass flow of the medium through the measuring channel leading to the sensor chip, as well as possibly to the reduction of a signal drift and the improvement of the signal-to-noise ratio. The signal drift refers to the deviation, for example, of the mass flow of the medium in the sense of a change in the characteristic-curve relation between the mass flow actually occurring and the signal to be output, ascertained in the course of calibration during manufacture. The sensor signals output in rapid temporal sequence are considered in the ascertainment of the signal-to-noise ratio, whereas the characteristic-curve drift or signal drift relates to a change in the average value.

In the case of conventional hot-film air-mass meters of the type described, generally, a sensor carrier having a sensor chip mounted on it or incorporated into it projects into the measuring channel. For example, the sensor chip may be glued into or onto the sensor carrier. The sensor carrier together, for instance, with a metal bottom plate on which electronics, a control and evaluation circuit (e.g., having a circuit carrier, especially a printed circuit board) may also be glued, are able to form one unit. For instance, the sensor carrier may be realized as an injection-molded plastic part of an electronic module. The sensor chip and the control and evaluation circuit may be joined to each other by bonds, for example. The electronic module thus obtained may be glued into a sensor housing, for instance, and the entire plug-in sensor may be closed with covers.

German Patent No. DE 198 15 654 A1 describes a measuring device for measuring the mass of a medium flowing in a line. The measuring device has a measuring element that is circumflowed by the flowing medium and is situated in a measuring-device flow channel provided in the line. The flow channel extends along a main flow direction between an inlet opening connected to the line and at least one outlet opening downstream of the inlet opening and leading into the line. The flow channel branches out at a first separation point, located between the inlet opening and the measuring element, into a measuring channel in which the measuring element is situated, and a bypass channel that bypasses the measuring element in the main flow direction.

European Patent No. EP 0 369 592 A2 describes a measuring device for measuring the mass of a flowing fluid medium. The measuring device has a flow channel which connects an inlet opening to an outlet opening. The flow channel branches out into several further channels, one of which is the actual measuring channel in which the sensor element is disposed.

The present-day sensor systems usually have a one-sided outlet from the main channel through which particles and water or other liquids such as oil, for example, are able to be eliminated again owing to their inertia.

In spite of the numerous advantages of the conventional methods and devices, they still include potential for improvement with regard to functional aspects. Thus, the one-sided outlet necessitates that the plug-in sensor be circumflowed asymmetrically. As a result, the sensitivity to changing incident-flow conditions, e.g., due to clogging filter mats, is increased. Such changes in the characteristic curve are perceived by the control device as drift, so that in the worst case, the hot-film air-mass meter is diagnosed as defective even though the cause for the deviation lies in the altered incident flow and, for example, a filter change would solve the actual problem.

In addition, an opening for the discharge of dirt or, in the event the lateral dirt outlet is shifted into the cover, a ramp for leading to the opening may be provided in the housing body of the sensor housing. Therefore, changes in the bypass cover are only possible in so far as the position of this opening or ramp remains the same. For maximum freedom in the design of the bypass cover, it would be advantageous if the housing body would have no opening or ramp, thus, were essentially just in the area of the bypass cover. This would also mean a significant simplification in the injection-molding process of the housing body.

SUMMARY

Therefore, a sensor system is provided for determining at least one parameter of a fluid medium flowing through a channel structure, which at least to a great extent is able to avoid the disadvantages of conventional methods and strategies, and in which, in particular, the opening or ramp in the housing body is avoided due to the fact that the dirt outlet is placed in the cover in such a way that the outlet is shifted to the end face of the plug-in sensor or to a downstream side of the plug-in sensor. At the same time, in particular, an asymmetrical circumflow of the plug-in sensor is avoided.

The sensor system of the present invention for determining at least one parameter of a fluid medium flowing through a channel structure, especially an induction air mass flow of an internal combustion engine, includes a sensor housing, particularly a plug-in sensor that is inserted or is insertable into a flow pipe and in which the channel structure is formed. The sensor housing has a housing body and a cover. The channel structure has a main channel and a measuring channel. At least one sensor chip for determining the parameter of the fluid medium is disposed in the measuring channel. The sensor housing has an inlet into the channel structure—the inlet pointing counter to a main flow direction of the fluid medium—at least one main-channel outlet from the main channel and at least one measuring-channel outlet from the measuring channel. The main-channel outlet is disposed on an end face or on a downstream side of the cover based on the main flow direction.

The measuring-channel outlet may be disposed on the end face or on the downstream side of the cover based on the main flow direction. The measuring-channel outlet may be located on the same side of the cover as the main-channel outlet. The measuring-channel outlet may protrude further from the cover than the main-channel outlet. The measuring-channel outlet may be formed as a chimney-like projection. The chimney-like projection may have a collar. The main-channel outlet may be disposed on an end face of the cover, the measuring-channel outlet being situated on the end face of the cover, downstream of the main-channel outlet based on the main flow direction. The main-channel outlet may be situated on the downstream side of the cover based on the main flow direction, the main channel extending generally parallel to the main flow direction. The main-channel outlet and the measuring-channel outlet may be formed separate from each other. The channel structure may be formed in the cover.

The main flow direction within the context of the present invention is understood to be the local flow direction of the fluid medium at the location of the sensor or sensor system, it being possible to disregard local irregularities such as turbulences, for example. In particular, the main flow direction may thus be understood to be the local average transit direction of the flowing fluid medium at the location of the sensor system. In this context, the average transit direction relates to a transit direction in which the fluid medium predominantly flows, averaged over time.

A downstream placement within the context of the present invention is understood to be the placement of a component at a location which the fluid medium, flowing in the main flow direction, reaches later in time than a reference point.

Analogously, within the context of the present invention, an upstream placement of a component is understood to be a placement of the component at a location which the fluid medium, flowing in the main flow direction, reaches earlier in terms of time than a reference point.

A housing body and a cover within the context of the present invention are understood to be at least two components of the sensor housing which interact and which, for example, are in a direct contact like, for instance, a force-locking and/or a form-locking and/or a material-locking connection.

The housing body and the cover may in each case be one-part or multi-part. In this context, a cover is generally understood to be a component of the sensor housing which, around the outlet opening, forms a surface facing the fluid medium outside of the sensor housing. On the other hand, the housing body is a component which is disposed in the area of the outlet opening on the side of the sensor housing opposite this surface. The present invention proposes forming the at least one channel in the cover. For example, the housing body and/or the cover may be produced completely or partially from a plastic material, however, the use of other materials, e.g., ceramic and/or metallic materials, being alternatively or additionally possible, as well. For instance, the housing body and the cover may be part of a plug-in sensor.

In general, the outlet opening may have any cross-section as desired, e.g., a round, oval, polygonal or perhaps slot-shaped cross-section. Preferably, the outlet opening may be situated on a lateral surface of the plug-in sensor, the lateral surface being disposed in such a way in the flow pipe that, by preference, it is aligned essentially parallel to a main flow direction, thus, with a deviation of preferably no more than 20°, particularly no more than 10°, and especially preferred, no more than 50° from a parallel alignment with respect to the main flow direction.

Further possible refinements relate to the channel structure of the sensor system. This channel structure may be one-part or multi-part. In particular, at least one sensor element for detecting the at least one parameter may be accommodated in the channel structure. This sensor element may especially be a hot-film air-mass-meter sensor element, e.g., a hot-film air-mass-meter sensor chip according to the description above. However, other embodiments are alternatively or additionally possible, as well.

In particular, the channel structure may have at least one main channel and at least one bypass channel branching off from the main channel. The sensor element may especially be disposed in the optional, at least one bypass channel. For example, the main channel may extend from a frontal inlet opening situated upstream, to the outlet opening. The bypass channel may branch off from the main channel and lead into one or more bypass-channel outlet openings which, for instance, may likewise be disposed on a lateral surface of the plug-in sensor and/or on a head side which projects the furthest into the flowing fluid medium. However, other embodiments are possible, as well.

In particular, the cover may have an outer side facing the fluid medium. For instance, this outer side may face the fluid medium outside of the sensor housing, especially in the flow pipe, and, for example, may be circumflowed or circumcirculated by the fluid medium in the flow pipe.

In accordance with example embodiments of the present invention, the opening or ramp in the unit housing are avoided by placing the dirt outlet in the cover in such a way that the outlet is shifted onto the end face of the plug-in sensor or onto a downstream side of the plug-in sensor. The asymmetry in the circumflow caused by the hot-film air-mass meter is thereby eliminated, as well. In this manner, the sensitivity to altered incident-flow conditions may be reduced.

BRIEF DESCRIPTION OF THE DRAWINGS

Further optional particulars and features of the present invention are described below with reference to preferred exemplary embodiments, which are shown schematically in the figures.

DETAILED DESCRIPTION OF EXAMPLE EMBODIMENTS

Figure 1:
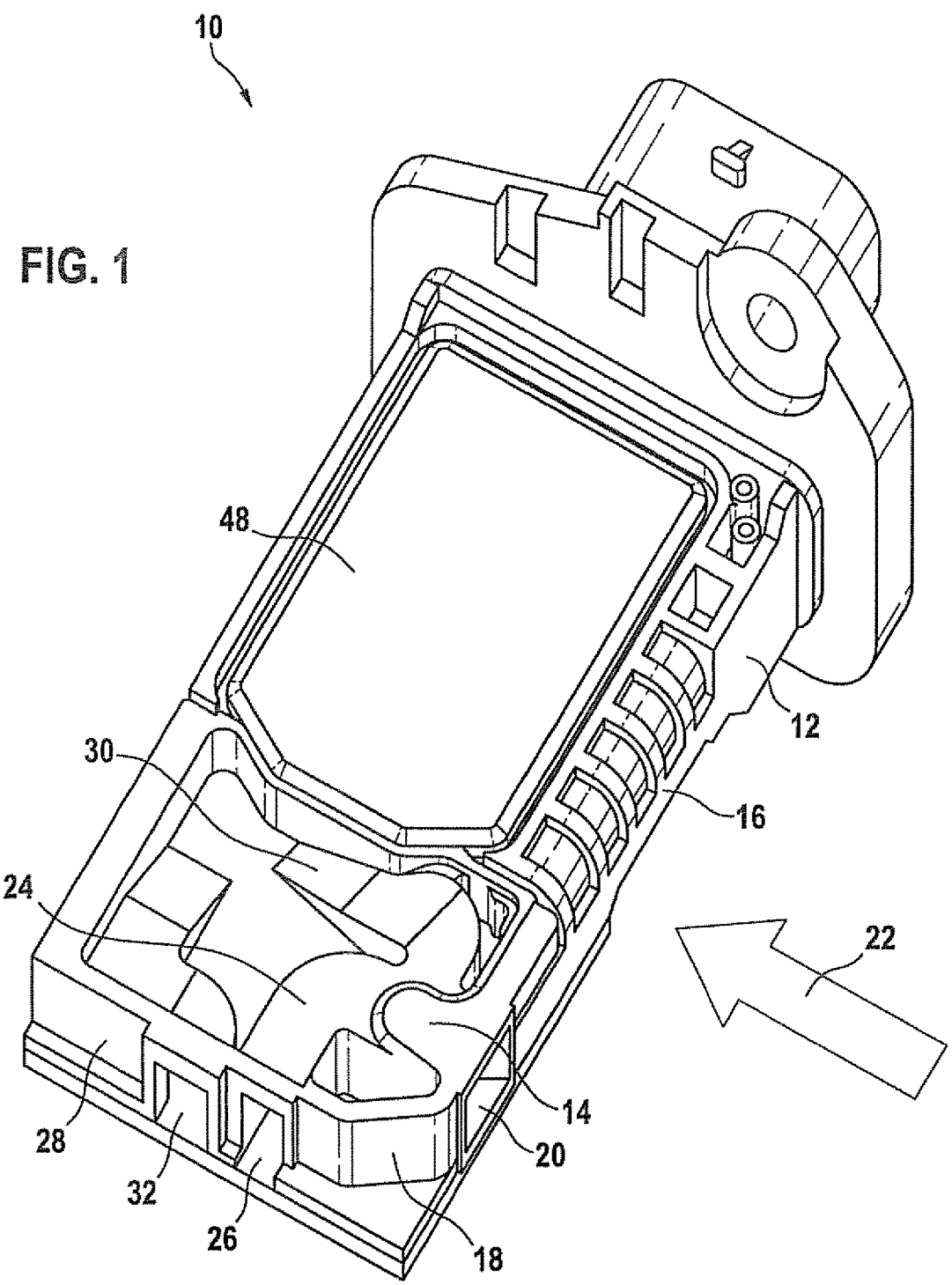
FIG. 1 shows a perspective representation of a sensor system according to a first specific embodiment.

FIG. 1 shows a perspective representation of a sensor system 10 for determining a parameter of a fluid medium flowing through a channel according to a first specific embodiment of the present invention. Sensor system 10 in this exemplary embodiment takes the form of a hot-film air-mass meter, and in particular, is able to detect an induction air mass flow of an internal combustion engine. In this exemplary embodiment, sensor system 10 includes a sensor housing 12. Sensor housing 12 is formed as a plug-in sensor which, for example, may be inserted into a flow pipe, especially into an induction tract of the internal combustion engine. A channel structure 14 is formed in sensor housing 12, as explained in detail below. Sensor housing 12 has a housing body 16 and a cover 18. Channel structure 14 is formed in cover 18. A representative amount of the fluid medium is able to flow through channel structure 14 via an inlet opening or an inlet 20, which in the inserted state points counter to a main flow direction 22 of the fluid medium.

Figure 2:
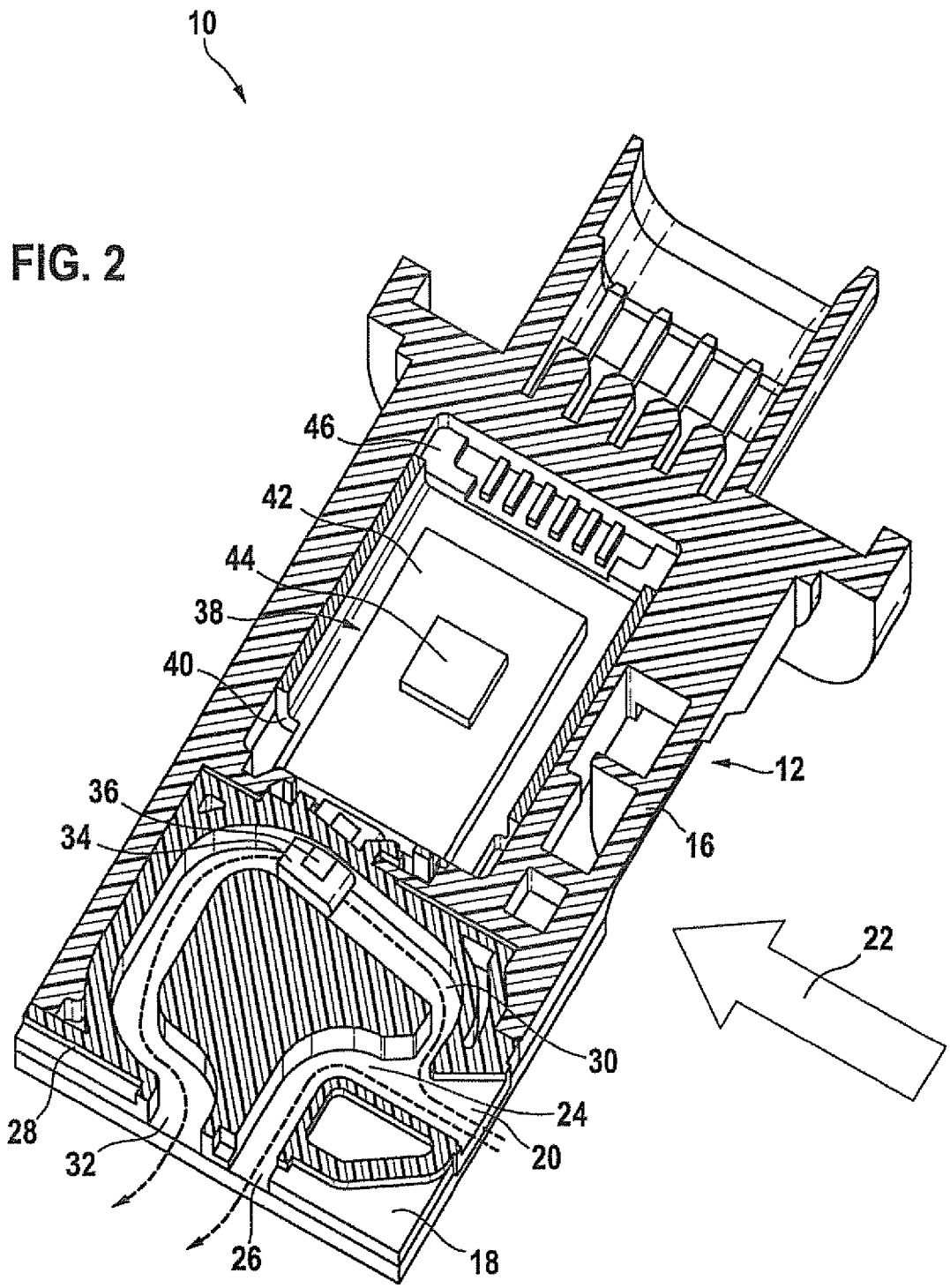
FIG. 2 shows a sectional view parallel to the main flow direction and to an extension direction of the plug-in sensor of the sensor system.

FIG. 2 shows a sectional view parallel to the main flow direction and to an extension direction of sensor housing 12 of sensor system 10. Channel structure 14 has a main channel 24 which leads into a main-channel outlet 26 on an end face 28 of sensor housing 12, and more precisely, of cover 16 based on the representation in FIG. 1, as well as a bypass or measuring channel 30, branching off from main channel 24, which leads into a measuring-channel outlet 32 of measuring channel 30 likewise situated on end face 28. Thus, measuring-channel outlet 32 is located on the same side of cover 18 as main-channel outlet 26. In addition, as can be seen from FIG. 2, based on main flow direction 22, measuring-channel outlet 32 is situated downstream of main-channel outlet 26 on end face 28. In this context, main-channel outlet 26 and measuring-channel outlet 32 are formed separate from each other.

As in the case of conventional air-mass sensors, a sensor carrier 34 in the form of a wing projects into measuring channel 30. A sensor chip 36 is embedded in this sensor carrier 34 in such a way that the fluid medium flows over a sensor membrane formed as sensor area of sensor chip 36. Sensor carrier 34, together with sensor chip 36, is part of an electronic module 38 which has a bent bottom plate 40 as well as a printed circuit board 42 that is mounted, e.g., glued on it, and has a control or evaluation circuit 44. For example, sensor carrier 34 may be injection-molded as a plastic component onto bottom plate 40. Sensor carrier 34, which, for instance, is injection-molded as an injection-molded component onto bottom plate 40 and may then be formed integrally with bottom plate 40 of printed circuit board 42, is provided with an incident-flow edge that may be rounded.

Sensor chip 36 is connected electrically to control and evaluation circuit 44 via electrical connections that may be implemented as wire bonding. Electronic module 38 thus obtained is inserted, e.g., glued into an electronics compartment 46 of sensor housing 12, and more precisely, of housing body 16. This may be accomplished in such a way that in the process, sensor carrier 34 projects into channel structure 14, as shown in FIG. 2. Electronics compartment 46 is subsequently closed by an electronics-compartment cover 48.

Figure 3:
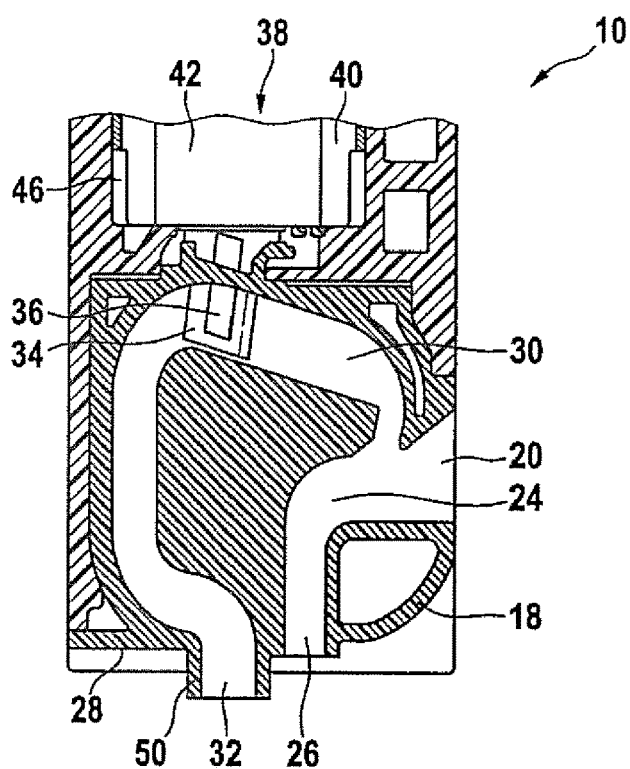
FIG. 3 shows a first modification of the first specific embodiment.

FIG. 3 shows a sectional view of sensor system 10 of the first specific embodiment according to a first modification. In this case, the intersection runs parallel to main flow direction 22 and parallel to an extension direction of sensor housing 12. In the following, only the differences from the first specific embodiment are described, and identical components are provided with identical reference numerals. Channel structure 14 can be seen in FIG. 3. In addition, it can be seen that measuring-channel outlet 32 protrudes further from cover 18 than main-channel outlet 26. For example, measuring-channel outlet 32 is formed as chimney-like projection 50. The minimization of the interaction of main-channel outlet 26 with measuring-channel outlet 32 achieved may be important for the attained effect of sensor system 10 according to the present invention. Ideally, these two outlets 26, 32 are completely separated from each other. In practice, a very good separation is achieved by the fact that, as described above, the two outlets are offset geometrically from each other. This effect is enhanced by chimney-like projection 50. Thus, it projects farther into the circumflow of sensor housing 12 than main-channel outlet 26. The further chimney-like projection 50 projects from cover 18 into the circumflow of sensor housing 12, the better the separation. According to the present invention, 2 mm is provided as minimum dimension for chimney-like projection 50.

Figure 4:
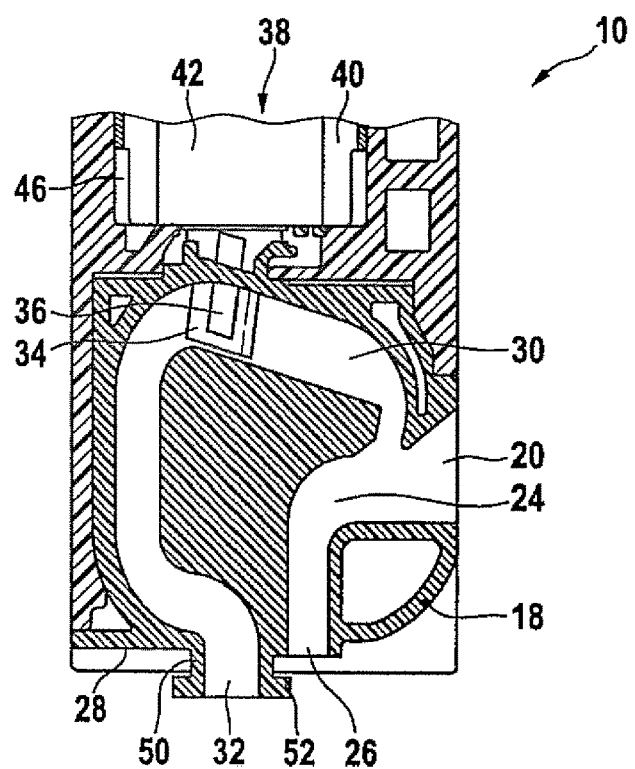
FIG. 4 shows a second modification of the first specific embodiment.

FIG. 4 shows a sectional view of sensor system 10 of the first specific embodiment according to a second modification. In this case, the intersection runs parallel to main flow direction 22 and parallel to an extension direction of sensor housing 12. In the following, only the differences from the first specific embodiment and the first modification are described, and identical components are provided with identical reference numerals. The effect described for the first modification is further improved by the fact that chimney-like projection 50 has a collar 52. In this instance, collar 52 surrounds projection 50 or measuring-channel outlet 32. Due to this special geometry of chimney-like projection 50, particles which, starting from main-channel outlet 26, flow in main flow direction 22, are prevented from streaming into measuring-channel outlet 32.

Figure 5:
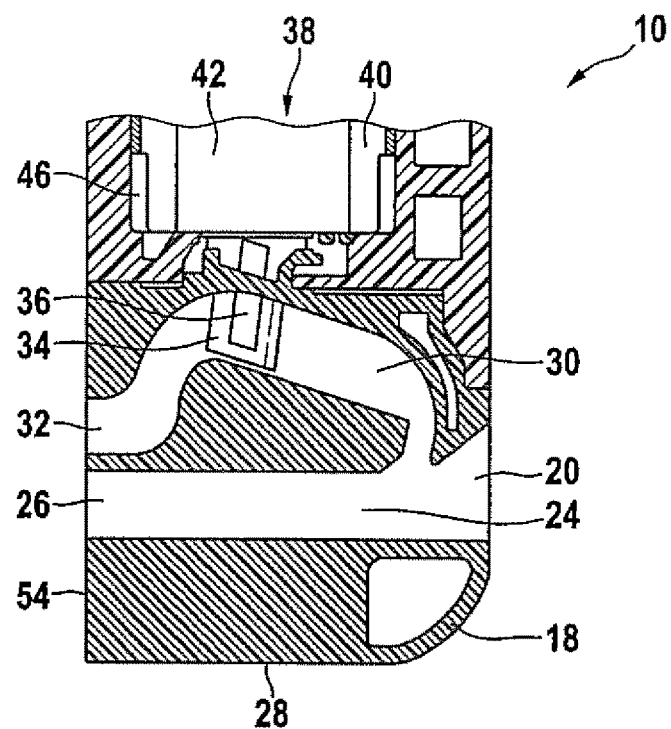
FIG. 5 shows a sectional view parallel to the main flow direction and parallel to an extension direction of the plug-in sensor of the sensor system according to a second specific embodiment.

FIG. 5 shows a sectional view parallel to main flow direction 22 and to an extension direction of sensor housing 12 of sensor system 10 according to a second specific embodiment of the present invention. In the following, only the differences from the first specific embodiment are described, and identical components are provided with identical reference numerals.

In sensor system 10 of the second specific embodiment, main-channel outlet 26 is located on a downstream side 54 of cover 18. Measuring-channel outlet 32 is likewise located on downstream side 54 of cover 18. Accordingly, measuring-channel outlet 32 is located on the same side of cover 18 as main-channel outlet 26 in the second specific embodiment, as well. In this case, main channel 24 extends generally parallel to main flow direction 22, preferably with a deviation of no more than 20° and especially preferred of no more than 10° from main flow direction 22. In particular, main channel 24 is straight. Since in this second specific embodiment, main-channel outlet 26 and measuring-channel outlet 32 lie in the wind shadow of sensor housing 12, perhaps less air would be pulled through measuring-channel outlet 32. The signal of sensor chip 36 can thereby become weaker and therefore more sensitive.

Figure 6:
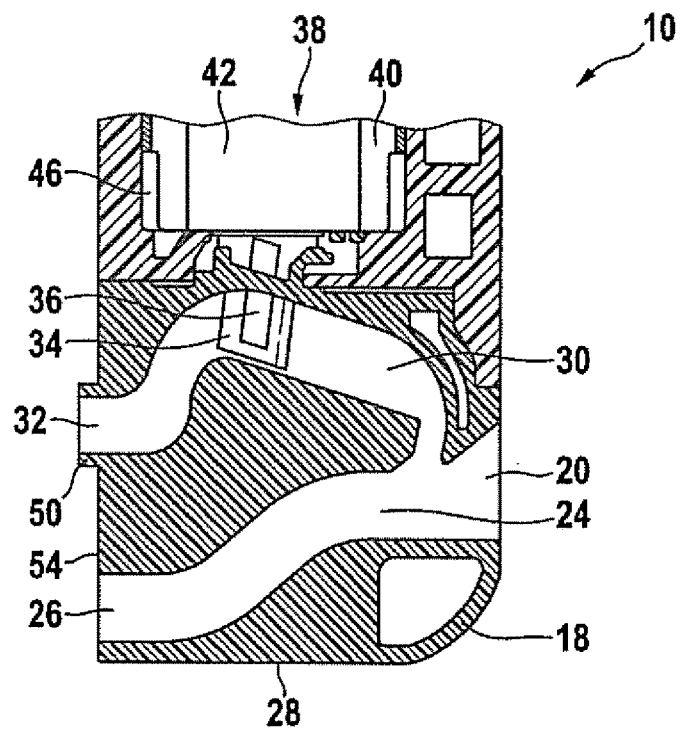
FIG. 6 shows a modification of the second specific embodiment.

FIG. 6 shows a sectional view of sensor system 10 of the second specific embodiment according to a modification. In this case, the intersection runs parallel to main flow direction 22 and parallel to an extension direction of sensor housing 12. In the following, only the differences from the second specific embodiment are described, and identical components are provided with identical reference numerals. Main channel 24 is not straight, but rather is slightly curved. With increasing run length in the direction toward downstream side 54 of the cover, main channel 24 moves away from measuring channel 30. In addition, measuring-channel outlet 32 also projects further from cover 18 here than main-channel outlet 26. Optionally, measuring-channel outlet 32 may be formed as chimney-like projection 50 here, as well.

What is claimed is:

1. A sensor system for determining at least one parameter of a fluid medium flowing through a channel structure, the sensor system comprising:
    a sensor housing which is inserted or is insertable into a flow pipe and in which the channel structure is formed, the sensor housing having a housing body and a cover, the channel structure having a main channel and a measuring channel, at least one sensor chip for determining the parameter of the fluid medium being disposed in the measuring channel, the sensor housing having an inlet into the channel structure, the inlet pointing counter to a main flow direction of the fluid medium, at least one main-channel outlet from the main channel and at least one measuring-channel outlet from the measuring channel;
    wherein the main-channel outlet is located on one of an end face or a downstream side of the cover, based on the main flow direction,
    wherein the measuring-channel outlet projects (i) downstream of the main-channel outlet based on the main flow direction and (ii) further from the cover than the main-channel outlet.

2. The sensor system as recited in claim 1, wherein the sensor system determines at least one parameter of an induction air mass flow of an internal combustion engine.

3. The sensor system as recited in claim 1, wherein the measuring-channel outlet is located on one of the end face or on the downstream side of the cover based on the main flow direction.

4. The sensor system as recited in claim 1, wherein the measuring-channel outlet is disposed on the same side of the cover as the main-channel outlet.

5. The sensor system as recited in claim 1, wherein the measuring-channel outlet is formed as a chimney-like projection.

6. The sensor system as recited in claim 1, wherein the main-channel outlet is disposed on the downstream side of the cover based on the main flow direction, the main channel extending parallel to the main flow direction.

7. The sensor system as recited in claim 1, wherein the main-channel outlet and the measuring-channel outlet are formed separate from each other.

8. The sensor system as recited in claim 1, wherein the channel structure is formed in the cover.

9. A sensor system for determining at least one parameter of a fluid medium flowing through a channel structure, comprising:
    a sensor housing which is inserted or is insertable into a flow pipe and in which the channel structure is formed, the sensor housing having a housing body and a cover, the channel structure having a main channel and a measuring channel, at least one sensor chip for determining the parameter of the fluid medium being disposed in the measuring channel, the sensor housing having an inlet into the channel structure, the inlet pointing counter to a main flow direction of the fluid medium, at least one main-channel outlet from the main channel and at least one measuring-channel outlet from the measuring channel;
    wherein the main-channel outlet is located on one of an end face or a downstream side of the cover, based on the main flow direction,
    wherein the measuring-channel outlet is formed as a chimney-like projection,
    wherein the chimney-like projection has a collar.

10. A sensor system for determining at least one parameter of a fluid medium flowing through a channel structure, comprising:
    a sensor housing which is inserted or is insertable into a flow pipe and in which the channel structure is formed, the sensor housing having a housing body and a cover, the channel structure having a main channel and a measuring channel, at least one sensor chip for determining the parameter of the fluid medium being disposed in the measuring channel, the sensor housing having an inlet into the channel structure, the inlet pointing counter to a main flow direction of the fluid medium, at least one main-channel outlet from the main channel and at least one measuring-channel outlet from the measuring channel;
    wherein the main-channel outlet is located on one of an end face or a downstream side of the cover, based on the main flow direction,
    wherein the main-channel outlet is disposed on the end face of the cover, the measuring-channel outlet being located on the end face of the cover, downstream of the main-channel outlet based on the main flow direction.

* * * * *